Aug. 27, 1957 R. D. PIKE 2,804,383
COMPLETE CONCENTRATED MIXED FERTILIZER
Filed May 3, 1954
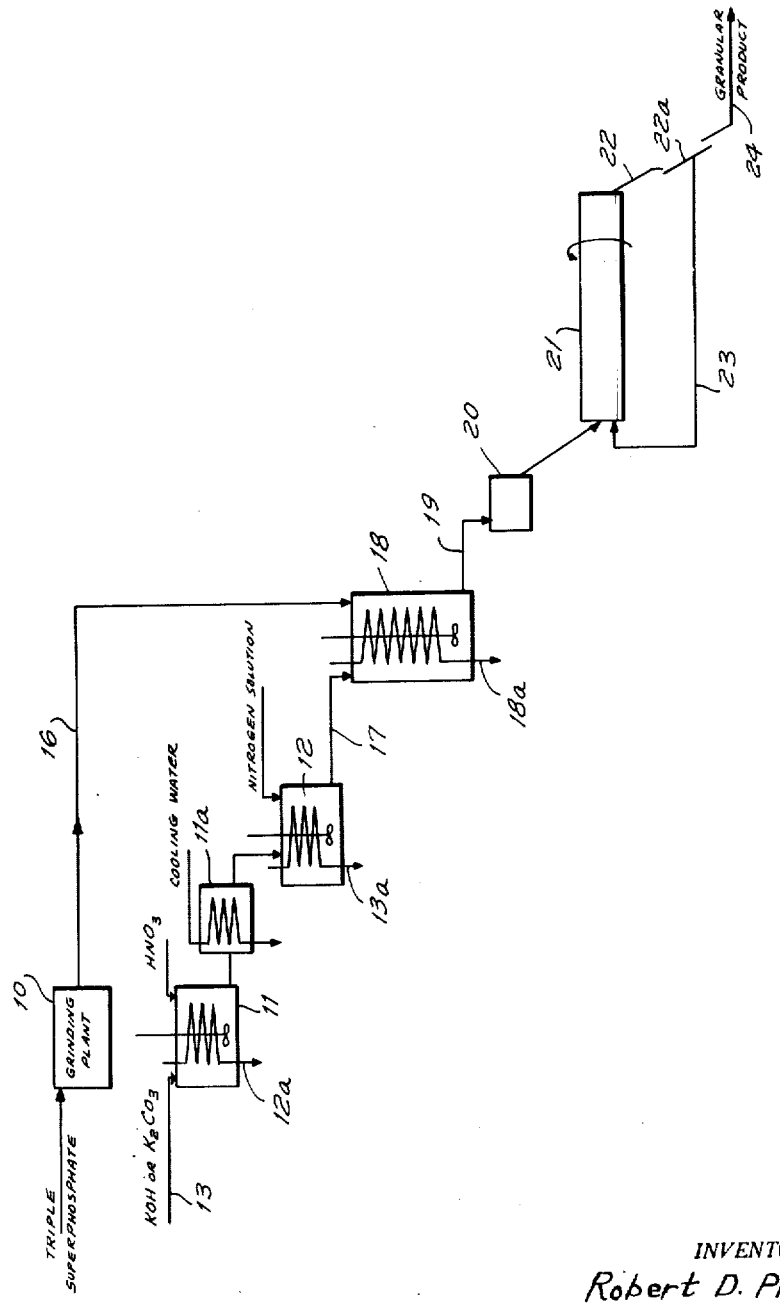
INVENTOR.
Robert D. Pike
BY
Pollard, Johnston, Smythe & Robertson
ATTORNEYS

United States Patent Office 2,804,383
Patented Aug. 27, 1957

2,804,383

COMPLETE CONCENTRATED MIXED FERTILIZER

Robert D. Pike, Greenwich, Conn.; Kenneth B. Ray and The Stamford Trust Company, executors of said Robert D. Pike, deceased Application May 3, 1954, Serial No. 427,186

6 Claims. (Cl. 71—35)

This invention relates to a new complete concentrated mixed fertilizer and to a method for making the same. This fertilizer contains the three principal plant food unit ingredients, $N_2$, $P_2O_5$, and $K_2O$, in relative proportions found from experience to be widely used in the continental United States.

In the table presented hereinbelow I give data from authoritative sources showing the consumption of mixed fertilizer for the five principal regions of the United States and for the continental United States as a whole for the year ended June 30, 1952.

TABLE

*Consumption of mixed fertilizers for the year ended June 30, 1952 in the entire continental United States and in five of its principal regions*

| Principal Regions | Fertilizer Mixtures Consumed, Total Tons | Example No. | $N_2$, percent | $P_2O_5$, percent | $K_2O$, percent | Total Concentration, percent |
|---|---|---|---|---|---|---|
| Middle Atlantic | 1,711,719 | | 4.38 | 11.64 | 9.0 | 25.02 |
| New England | 402,396 | | 5.30 | 10.46 | 12.07 | 27.35 |
| South Atlantic | 5,550,994 | 3 | 3.88 | 9.35 | 8.02 | 21.25 |
| East North Central | 3,397,240 | 2 | 3.27 | 12.75 | 12.86 | 28.88 |
| East South Central | 2,167,467 | | 4.18 | 10.56 | 8.02 | 22.56 |
| Continental U. S. | 14,608,504 | 1 | 4.16 | 11.24 | 9.38 | 24.78 |

It will be noted that the five principal regions selected for comparison in the table consume about 87% of the total mixed fertilizer used in the entire continental United States and that although there is some variation in the analysis and the total concentration of the mixes, the variation is not of a great magnitude. Thus it will be seen that in the balanced mixed fertilizer the $N_2$ content varies from about 3.2 to 5.3%, the $P_2O_5$ content varies from about 9.4 to 12.8%, and the $K_2O$ content varies from about 8.0 to 12.9% of the total fertilizer mix.

The desirability of having balanced mixed concentrated fertilizers is apparent. For instance, the fertilizer business is a very competitive one and it will be apparent that freight savings could be made proportional to increases in concentration of active fertilizer ingredients, provided balanced, stable mixed fertilizers could be produced. For example, freight costs could be reduced to half their present value if the mixed balanced fertilizers in the table contained about 50% active ingredients instead of the about 25% active ingredients disclosed. Yet, highly concentrated balanced mixed fertilizers are not commercially available. This condition may be due to the known difficulty of producing a balanced mixed fertilizer of high concentration which does not absorb moisture and cake.

An object of this invention is to produce a concentrated complete fertilizer mix which will have over twice the concentration of plant food units which were marketed in 1952 as shown in the table while retaining the same relative concentrations as between the several units, $N_2$, $P_2O_5$ and $K_2O$.

A further object of this invention is to provide a highly concentrated complete mixed fertilizer which is comparatively free from moisture absorbing components, or has such a small amount of these present that they do not absorb sufficient water to impair the physical property of the fertilizer even when it is packed or stored in a moist humid climate.

An additional object of this invention is to provide a highly concentrated complete fertilizer mix containing potassium nitrate as the principal source of nitrogen wherein the potassium nitrate used is either free from sodium nitrate or has a very low concentration thereof, thereby increasing the resistance of the fertilizer to the absorption of moisture in a humid climate.

Another object of this invention is to effect mixing and drying of a complete highly concentrated mixed fertilizer by adding the other ingredients to a saturated solution of potassium nitrate which should be preferably at a temperature not much, if any, in excess of 30° C., and containing a considerable amount of the potassium nitrate in the form of crystals whereby a mixture of the ingredients is produced which is of pea soup-like consistency and may be run to dryness to produce a thoroughly incorporated granular mixed fertilizer.

A further object of my invention is to produce a complete concentrated mixed fertilizer which will be substantially free of chlorides and will therefore be valuable for use in the fertilization of crops which do not tolerate chloride.

Various other objects and advantages of my invention will appear as this description proceeds.

The process involved in the preparation of my new complete highly concentrated mixed fertilizer is extremely simple. No by-products are produced and all of the materials added appear in the final product, except for unavoidable mechanical losses. Also, there is no systematic production of waste or off-grade material containing little or no plant food nutrients.

Reference to the flow sheet will explain diagrammatically a preferred method for carrying out my process.

In the flow sheet, 10 indicates a grinding plant for grinding superphosphates, advantageously triple (concentrated) superphosphate, preferably to:

on 14— 0.0%
16— 1.0
20— 2.0
30— 7.0
40—17.0
50—29.0
through 50—71.0

Caustic potash, KOH, or potassium carbonate, substantially free from chlorides, enters the line 13 into mixing tank 11, into which nitric acid is introduced through the line 14, producing a saturated solution of potassium nitrate at about 66° C.

If caustic potash is introduced through the line 13, it is preferably made in an electrolytic plant from muriate of potash containing not less than 62.5% $K_2O$. In this case, all of the chlorine in the muriate compound is recovered as chlorine gas, which is a valuable by-product.

If potassium carbonate is used, this may be produced most advantageously by the base exchange process from wyomingite, substantially free from any impurities such as those disclosed in Pike Patent 2,343,080 issued February 29, 1944. This potassium carbonate may be used to form potassium nitrate with nitric acid in the mixing tank 11, which may be provided with steam heated pipe coil 12a.

As stated, I prefer to use a substantially pure $KNO_3$ for I thereby avoid both the chloride and the sodium nitrate impurities, but I may use other potash solutions which are substantially free of $NaNO_3$ and yet obtain a moisture-stable mixed fertilizer. This solution passes through cooler 11a where its temperature is reduced to about 30° C., thus producing some fine crystals of potassium nitrate. The slurry of the potassium nitrate crystals in the solution of potassium nitrate next goes to mixing tank 12 where nitrogen in the form of nitrogen solution may be added, provided the $KNO_3$ does not contain enough nitrate nitrogen to provide the proper balance between $N_2$ and $K_2O$. Tank 12 is preferably provided with a cooling coil 13a which is useful in keeping loss of $NH_3$ at a minimum. Customarily nitrogen of the nitrogen solution is partly in the form of nitrate and partly in the form of ammonia. Typical nitrogen solutions can be found in Collins, "Commercial Fertilizers" (fourth ed.), 1947, The Blakiston Co., Philadelphia, Pa.—page 222. It will be understood, however, that nitrogen solution is a term referring to solutions of $NH_3$ and other compounds of nitrogen in water and that such solutions may be formed in situ or obtained for use already in solution. By having the temperature in 12 at substantially room temperature, but not more than about 30° C., the nitrogen solution can be added without causing appreciable loss of ammonia to the atmosphere. The solution from 12 passes through the line 17 into mixing tank 18 where the ground triple superphosphate is introduced in the line 16 to provide desired amounts of $P_2O_5$. In 18, combination is effected between the ammonia and other compounds of nitrogen, added in the nitrogen solution, and the ground triple superphosphate. A cooling coil 18a is preferably provided to prevent reaction between the potassium nitrate and the triple superphosphate producing $Ca(NO_3)_2$ as well as to prevent loss of $NH_3$. The presence of $Ca(NO_3)_2$ is very undesirable for it is hygroscopic. The output from mixer 18 passes through line 19 into feed tank 20 and thence into rotary dryer 21. The product of the dryer goes through line 22 onto screen 22a, material passing through the screen preferably being recirculated through the line 23 back to 21 and the granular product being delivered by the system through the line 24. This granular product may be stored without caking, even in the most humid summer weather, which property results from the method of manufacture and the purity of the product.

In the practice of the embodiment of this invention discussed hereinbefore it has been discovered that temperatures in excess of 30° C. are frequently necessary if the $KNO_3$ is to be dissolved and thereby uniformly dispersed in a body of water which is sufficient to form a thoroughly mixed aqueous body of balanced fertilizer materials of desired fluidity for use in the process of the invention. On the other hand, it has been discovered that temperatures in excess of 30° C. should be avoided when ammonia or nitrogen solutions are to be added both to avoid loss of nitrogen and to enable one to ascertain in advance the relative proportions of the principal plant foods in the produced fertilizer mix.

In accordance with another embodiment of my invention, the $KNO_3$ may supply all of the $N_2$ within the desired higher percentage and desired relative proportion but insufficient $K_2O$ for a balanced mixed fertilizer. Under such circumstances a potassium salt, other than a nitrate, such as potassium sulfate, is introduced into mixing tank 12 to supply the deficiency instead of the nitrogen solution as shown in the diagrammatic flow sheet. Since potassium sulfate is stable at temperatures of 66° C., or even higher, it is not necessary to cool the mixtures to temperatures below 30° C. when using such stable salts although coolants or cooling means may be used to avoid the formation of hygroscopic calcium nitrate and the loss of $NH_3$.

In the practice of my invention in conformity with the procedures just described, I utilize a body of water which is adequate to provide a free flowing fluid mixture of the fertilizer ingredients of my mix. Normally, this aqueous body should be heated above room temperatures and usually above 30° C., say up to 66° C. and above, in order to dissolve the desired amount of $KNO_3$ and obtain its uniform distribution in the mix without providing more water than is necessary to provide the desired fluidity. The process is operable with more water than is necessary to provide the desired fluidity but its subsequent evaporation becomes an unnecessary burden upon the system. Also, if the $KNO_3$ of high purity, advantageously used in my process, is formed in situ the amount and temperature of the water should be adjusted so as to dissolve the $KNO_3$ and thereby simultaneously separate it from any insoluble impurities and obtain its uniform distribution in the system. Depending upon the desired relative percentage of $N_2$ and $K_2O$ in the mix within the percentage ranges found acceptable in the United States, as previously described, I introduce into the aqueous body an amount by weight of $KNO_3$ which will supply either the desired amount of $K_2O$ or $N_2$ in parts by weight within the aforesaid range of ratios. Thereafter if the $KNO_3$ supplies all of the desired $K_2O$ enough nitrogen solution is added to the aqueous body to provide the necessary parts by weight of nitrogen to adjust the $N_2:K_2O$ ratio to the desired value; or, if $KNO_3$ supplies all of the desired $N_2$ enough of a potassium salt, other than a nitrate, is added to provide the necessary parts by weight to adjust the $N_2:K_2O$ ratio to the desired value. It will be apparent that the $N_2$ content may be adjusted by adding a nitrate other than $KNO_3$ instead of a nitrogen solution. Such a procedure, however, would be disadvantageous for it would provide additional diluent material and additional nitrate nitrogen which is already provided in a major amount by the $KNO_3$. After the adjustment of the $N_2:K_2O$ ratio to a desired value, enough of a concentrated superphosphate is added and mixed into the aqueous body to provide the necessary parts by weight to supply all of the $P_2O_5$ in the desired proportions. It will be apparent that the concentration of the final fertilizer mix will be dependent upon the amount of materials added to the aqueous body containing the solution of the double fertilizer carrier $KNO_3$ to adjust the $K_2O$ or the $N_2$ content and also upon the amount and the nature of the superphosphate added to provide the desired amount of $P_2O_5$. Under all circumstances, however, the total amount of plant foods present greatly exceeds the amount present in known commercial fertilizers and normally approximately equals or exceeds twice the concentration shown in the table, i. e. a plant food nutrient content in excess of 50%.

For the purpose of citing adequate examples of the application of my process, I will present in the examples which follow calculations for mixtures made in accordance with my invention which will have substantially the same relative concentration of plant food units as were used either throughout the United States or in certain sections of the United States in the year ended June 30, 1952, which mixtures are described in essential detail in the table.

EXAMPLE 1

Applied to the relative average concentration of plant food units used in the entire continental United States for the year ended June 30, 1952.

Concentrated superphosphate containing 49% available $P_2O_5$ will be used as the source of the $P_2O_5$ and substantially pure potassium nitrate will be used as the source of $K_2O$. The pure potassium nitrate will have the analysis, $N_2$, 13.8%; $P_2O_5$, 0%; $K_2O$, 46.5%.

To calculate a complete concentrated fertilizer mixture having the same relative concentration of plant nutrients as in the less concentrated mixtures used in the continental United States for the year ended June 30, 1952, the following procedure is employed:

The amount of pure potassium nitrate required to supply the K₂O content of 100 lbs. of the average non-concentrated mix is, $$\frac{9.38}{.465} = 20.2 \text{ lbs. potassium nitrate}$$

This latter also contributes, .138×20.2=2.79 lbs. N₂, leaving 4.16−2.79=1.37 lbs. N₂, thereby furnished in the form of nitrogen solution or in other forms suitable for the purpose of ammoniation.

All of the P₂O₅ is furnished as concentrated superphosphate containing 49% available P₂O₅. The triple superphosphate required is therefore, $$\frac{11.24}{.49} = 22.9 \text{ lbs.}$$

The N₂ taken up by the concentrated superphosphate in the step of ammoniation is therefore, $$\frac{1.37}{22.9} \times 100 = 6.0\%$$

of the concentrated superphosphate. This is permissible because it is possible to add as much as 7.4% N₂ based on concentrated superphosphate without impairing the physical properties of the product. (See Collins, supra, p. 223.)

There may be used in ammoniating the concentrated superphosphate in the vessel 18, a nitrogen solution which contains 40.6% N₂ of which 11.4% is nitrate nitrogen and 29.2% is ammonia nitrogen. The total nitrogen solution required is, $$\frac{1.37}{.406} = 3.38 \text{ lbs.}$$

containing .385 lbs. nitrate N₂ and .99 lbs. ammonia N₂. About 20% of the added nitrogen solution will be water which will be evaporated so the net addition on a dry basis, .8×3.38=2.7 lbs.

*Summary of calculations, Example 1, covering 100 lbs. mixture before concentration*

|  | Pounds | Percentage |
|---|---|---|
| Nitrate nitrogen with pure potassium nitrate | 2.79 | |
| Nitrate nitrogen with nitrogen solution | .385 | |
| Total nitrate nitrogen | 3.18 | 76.4 |
| Ammonia nitrogen with nitrogen solution | .99 | 23.6 |
| Total nitrogen | 4.16 | 100.0 |
| P₂O₅ added with concentrated superphosphate | 11.24 | |
| K₂O added with potassium nitrate | 9.38 | |
| Total nutrients in 100 lbs. regular mixture | 24.78 | |
| Total dry weight of ingredients of the mix: | | |
| Potassium nitrate | 20.2 | 44.0 |
| Concentrated superphosphate | 22.9 | 50.1 |
| Nitrogen solution after evaporation | 2.7 | 5.9 |
| Total ingredients | 45.8 | 100.0 |
| Percent of plant food in concentrated fertilizer, $\frac{24.78}{45.8} \times 100 = 54.3\%$. | | |

The complete highly concentrated fertilizer mixture thus calculated has the following plant nutrient content expressed as percentage: N₂, 9.10; P₂O₅, 24.6; K₂O, 20.6, total, 54.3%.

These plant food nutrients are in the same relative proportion as those in the average for the entire continental United States in the year ended June 30, 1952, but their total concentration is 54.2% as compared with 24.78% which is 2.19 times as great.

EXAMPLE 2

For the calculation of this example I have selected the east-north-central region of the table not only because it is a large consumer of fertilizer mixes but also because the relative concentration of the plant food units is somewhat out of line with that on the average for the entire continental United States which has just been calculated in Example 1. The method of calculation is the same except for minor details.

The amount of pure potassium nitrate required to supply the K₂O content of 100 lbs. of the mixture before concentration is, $$\frac{12.86}{.465} = 27.7 \text{ lbs. potassium nitrate}$$

This latter also contributes .138×27.7=3.82 lbs. N₂, giving a surplus of 3.82−3.27=.55 lbs. N₂ which can easily be adjusted by omitting the use of $$\frac{.55}{3.82} \times 27.7 = 3.99 \text{ lbs.}$$

potassium nitrate and supplying the K₂O equivalent by adding the equivalent amount of potassium sulphate required, $$\frac{.465}{.486} \times 3.99 = 3.82 \text{ lbs. potassium sulphate}$$

All of the P₂O₅ is furnished as concentrated superphosphate containing 49% available P₂O₅. The concentrated superphosphate required is, therefore, $$\frac{12.75}{.49} = 26.0 \text{ lbs.}$$

The calculation at this point is simplified because no nitrogen solution is required since a surplus of N₂ is already provided with the full amount of potassium nitrate which has to be reduced somewhat, therefore, by substituting a small amount of potassium sulphate for potassium nitrate.

*Summary of calculations, Example 2, covering 100 lbs. mixture before concentration*

|  | Pounds | Percentage |
|---|---|---|
| Nitrate nitrogen with pure potassium nitrate | 3.27 | |
| Total nitrogen | 3.27 | 100.0 |
| P₂O₅ added with concentrated superphosphate | 12.75 | |
| K₂O added with potassium nitrate | 11.0 | |
| K₂O added with potassium sulphate | 1.86 | |
| Total K₂O | 12.86 | |
| Total nutrients in 100 lbs. of mixture before concentration | 28.88 | |
| Total dry weight of ingredients of the mix: | | |
| Potassium nitrate | 23.7 | 44.3 |
| Potassium sulphate | 3.8 | 7.1 |
| Total ingredients, containing K₂O | 27.5 | |
| Concentrated superphosphate | 26.0 | 48.6 |
| Total ingredients | 53.5 | 100.0 |
| Percent of plant food in concentrated fertilizer, $\frac{28.88}{53.5} \times 100 = 54.1\%$. | | |

The complete highly concentrated fertilizer mixture thus calculated has the following plant nutrient content expressed as percentage: N₂, 6.13; P₂O₅, 23.9; K₂O, 24.1; total, 54.1%.

These plant food ingredients are in the same relative proportion as those in the average for the east-north-central states of the United States in the year ended June 30, 1952, but their total concentration is 54% as compared with 28.88% which is 1.88 times as great.

EXAMPLE 3

This will be for the south-Atlantic region of the United States, chosen as being the largest consumer of fertiizer of any of the regions. The calculation follows:

The amount of pure potassium nitrate required to supply the K₂O content of 100 lbs. of the mixture of the concentration actually in use is $$\frac{8.02}{.465} = 17.25 \text{ lbs. potassium nitrate}$$

This latter contributes .138×17.25=2.38 lbs. N₂, leaving 3.88−2.38=1.5 lbs. N₂ to be furnished as nitrogen solution or in other forms suitable for easy ammoniation.

All the $P_2O_5$ furnished as concentrated superphosphate containing 49% available $P_2O_5$ is $$\frac{9.35}{.49} = 19.1 \text{ lbs.}$$

The $N_2$ taken up by the concentrated superphosphate in the step of ammoniation is, therefore, $$\frac{1.5}{19.1} \times 100 = 7.96\%$$

of the concentrated superphosphate. This is a little over the permitted 7.4% but not enough to be considered a serious matter. However, it may be pointed out that ammonium nitrate may be used to substitute for a small part of the nitrogen solution just as some potassium sulphate was used to substitute for a small amount of potassium nitrate in Example 2, as calculated above.

The total weight of nitrogen solution required is $$\frac{1.5}{.406} = 3.7 \text{ lbs.}$$

containing .422 lb. nitrate nitrogen and 1.08 lbs. ammonia $N_2$. The net addition of nitrogen solution on a dry basis after evaporation is $.8 \times 3.7 = 2.96$ lbs.

*Summary of calculations, Example 3, covering 100 lbs. mixture before concentration*

|  | Pounds | Percentage |
|---|---|---|
| Nitrate nitrogen with pure potassium nitrate | 2.38 |  |
| Nitrate nitrogen with nitrate solution | .42 |  |
| Total nitrate nitrogen | 2.80 | 72.2 |
| Ammonia nitrogen with nitrate solution | 1.08 | 27.8 |
| Total nitrogen | 3.88 | 100.0 |
| $P_2O_5$ added with concentrated superphosphate | 9.35 |  |
| $K_2O$ added with potassium nitrate | 8.02 |  |
| Total nutrients in 100 lbs. of mixture before concentration | 21.25 |  |
| Total dry weight of ingredients of the mix: |  |  |
| Potassium nitrate | 17.25 | 43.0 |
| Concentrated superphosphate | 19.10 | 48.66 |
| Nitrogen solution after evaporation | 2.96 | 7.54 |
| Total ingredients | 39.31 | 100.0 |
| Percent of plant food in concentrated fertilizer, $\frac{21.25}{39.31} \times 100 = 54.1\%$. |  |  |

The complete highly concentrated fertilizer mixture thus calculated has the following plant nutrient content expressed as percentage: $N_2$, 9.88; $P_2O_5$, 23.8; $K_2O$, 20.5; total, 54.18%.

These plant food ingredients are in the same relative proportion as those in the average for the south Atlantic states of the United States in the year ended June 30, 1952, but their total concentration is 54.2% as compared with 21.25% which is 2.55 times as great.

It will be apparent from the examination of the table, made in conjunction with the three examples cited, that any one of the types of mixed fertilizers may be made by my process with an approximate doubling of the concentration.

It will be apparent from a study of the preceding examples and the ingredients thereof and the modifications thereof in conformity with other desired ratios within the aforesaid ranges of $N_2:P_2O_5:K_2O$ that the highly concentrated mixed fertilizers of this invention can be prepared in a form which is highly resistant to absorption to atmospheric moisture with a total plant food nutrient content in excess of about 50% and that the nitrate nitrogen content is customarily at least about 72%. A further study of the examples and the potential modifications thereof discloses that the $KNO_3$ customarily constitutes at least 43% by weight of the mix and the concentrated superphosphate constitutes about 50% by weight of the mix and that the two together provide a combined weight slightly in excess of 90% of the mix. Theoretically, at least, the mix could contain less than 70% of nitrate nitrogen although the examples cited all show more than 70% by weight of nitrate nitrogen. I, therefore, prefer to use 70% as the minimum content of nitrate nitrogen.

If desired, surfactants, typified by synthetic detergents such as alkaryl sulfonates, say sulfonates of dodecyl benzene, may be used in the process of this invention.

It will be understood that the foregoing examples constitute illustrative embodiments of my invention and that various modifications and changes can be made therein without departing from the spirit of my invention or the scope of the appended claims. In particular, it will be understood that by appropriate diluting and blending, balanced mixed fertilizers can be provided of great flexibility which can be used throughout the United States. Therefore, it will be understood that my invention contemplates all changes and modifications in the examples which do not constitute departures from the spirit of my invention or the scope of the appended claims.

What is claimed is:

1. A method of producing a highly concentrated granular mixed fertilizer, which is resistant to absorption of atmospheric moisture, wherein the $N_2$ is derived principally from $KNO_3$ and the fertilizer contains the principal plant foods $N_2$, $P_2O_5$ and $K_2O$ in total concentration of at least about 50% and in a desired relative proportion by weight within the ranges of from about 3.2–5.3 of $N_2$: from about 9.3–12.8 of $P_2O_5$: from about 8.0–12.9 of $K_2O$, which comprises forming an aqueous body containing a solution of $KNO_3$ which is present in an amount sufficient to supply not less than about 70% of said $N_2$ and is substantially free of $NaNO_3$ and an amount of a plant food substance selected from the group consisting of (1) a potassium salt other than nitrate and (2) a nitrogen solution, in a quantity which adjusts the content of one of the plant foods $N_2$ and $K_2O$ to the desired relative proportion within the above stated range of $N_2$ and $K_2O$, mixing this adjusted aqueous body with a quantity of concentrated superphosphate supplying all of the desired $P_2O_5$ within the above stated range of $P_2O_5$, thereby forming a fluid aqueous mixture, and drying the fluid mixture to produce a granular fertilizer mix, said mix having at least 90% of its content by weight in the form of said $KNO_3$ and said superphosphate, said $KNO_3$ supplying not less than about 70% of the $N_2$, said mix having a total plant food nutrient content in excess of 50%.

2. A method of producing a highly concentrated granular mixed fertilizer, which is resistant to absorption of atmospheric moisture, wherein the fertilizer contains the principal plant foods $N_2$, $P_2O_5$ and $K_2O$ in total concentration of at least about 50% and in desired relative proportions by weight within the ranges of about 3.2–5.3 of $N_2$: from about 9.3–12.8 of $P_2O_5$: from about 8.0–12.9 of $K_2O$ which comprises forming an aqueous body containing a solution of $KNO_3$ which is substantially free of $NaNO_3$, said $KNO_3$ being present in an amount sufficient to supply all of the desired $K_2$ within the above stated range and not less than about 70% but not all of said $N_2$, said aqueous body containing part of the potassium nitrate as crystals, adding to the aqueous body a plant food nitrogen solution in a quantity which adjusts the content of $N_2$ to the desired relative proportion within said range of $N_2$, mixing this adjusted aqueous body with a quantity of concentrated superphosphate supplying all of the desired $P_2O_5$ within the above stated range of $P_2O_5$, thereby forming a fluid aqueous mixture, and drying the fluid mixture to produce a granular fertilizer mix, said mix having at least 90% of its content by weight in the form of said $KNO_3$ and said superphosphate, said $KNO_3$ supplying not less than about 70% of the $N_2$, said mix having a total plant food nutrient content in excess of 50%.

3. A method of producing a highly concentrated granular mixed fertilizer, which is resistant to absorption of atmospheric moisture, wherein the fertilizer contains the principal plant foods $N_2$, $P_2O_5$ and $K_2O$ in total concentration of at least about 50% and in desired relative proportions by weight within the ranges of about 3.2–5.3 of $N_2$: from about 9.3–12.8 of $P_2O_5$; from about 8.0–12.9 of $K_2O$ which comprises forming an aqueous body containing a solution of $KNO_3$ which is substantially free of $NaNO_3$ and $KCl$ at temperatures not substantially in excess of 30° C., said $KNO_2$ being present in an amount sufficient to supply all of the desired $K_2$ within the above stated range and not less than about 70% but not all of said $N_2$, said aqueous body containing part of the potassium nitrate as crystals, adding to the aqueous body an ammonia nitrogen solution in a quantity which adjusts the content of $N_2$ to the desired relative proportion within said range of $N_2$, mixing this adjusted aqueous body with a quantity of concentrated superphosphate supplying all of the desired $P_2O_5$ within the above stated range of $P_2O_5$, thereby forming a fluid aqueous mixture, and drying the fluid mixture to produce a granular fertilizer mix, said mix having at least 90% of its content by weight in the form of said $KNO_3$ and said superphosphate, said $KNO_3$ supplying not less than about 70% of the $N_2$, said mix having a total plant food nutrient content in excess of 50%.

4. A method of producing a highly concentrated granular mixed fertilizer, which is resistant to absorption of atmospheric moisture, wherein the fertilizer contains the principal plant foods $N_2$, $P_2O_5$ and $K_2O$ in total concentration of about 54.3% and in desired relative proportions by weight of about 4.2 of $N_2$:11.2 of $P_2O_5$:9.4 of $K_2O$, which comprises forming an aqueous body containing a solution of $KNO_3$ which is substantially free of $NaNO_3$ at temperatures not substantially in excess of 30° C., said $KNO_3$ being present in an amount sufficient to supply all of said $K_2O$ and 72% of the desired $N_2$, said aqueous body containing part of the potassium nitrate as crystals, adding to the aqueous body a plant food nitrogen solution in a quantity which adjusts the content of $N_2$ to the stated desired relative proportion thereof, mixing this adjusted aqueous body with a quantity of concentrated superphosphate supplying all of the stated desired proportions of $P_2O_5$, thereby forming a fluid aqueous mixture, and drying the fluid mixture to produce a granular fertilizer mix, said mix having at least 90% of its content by weight in the form of said $KNO_3$ and said superphosphate and having a total plant food nutrient content of about 54.3% and the plant foods $N_2$, $P_2O_5$ and $K_2O$ in respective percentages by weight of about 9.1%, 24.6% and 20.6%.

5. A method of producing a highly concentrated granular mixed fertilizer, which is resistant to absorption of atmospheric moisture, wherein the fertilizer contains the principal plant foods $N_2$, $P_2O_5$ and $K_2O$ in a total concentration of about 54.1% and in desired relative proportions by weight of about 3.3 of $N_2$:12.8 of $P_2O_5$:12.9 of $K_2O$, which comprises forming an aqueous body containing a solution of $KNO_3$ which is substantially free of $NaNO_3$, said $KNO_3$ being present in an amount sufficient to supply all of the said $N_2$, adding to the aqueous body potassium sulfate in a quantity which adjusts the content of $K_2O$ to the stated desired relative proportion thereof, mixing this adjusted aqueous body with a quantity of concentrated superphosphate supplying all of the stated desired proportion of $P_2O_5$, thereby forming a fluid aqueous mixture, and drying the fluid mixture to produce a granular fertilizer mix, said mix having at least 90% of its content by weight in the form of said $KNO_3$ and said superphosphate and having a total plant food nutrient content of about 54.1% and the plant foods $N_2$, $P_2O_5$ and $K_2O$ in respective percentages by weight of about 6.1%, 23.9% and 24.1%.

6. A method of producing a highly concentrated granular mixed fertilizer, which is resistant to absorption of atmospheric moisture, wherein the fertilizer contains the principal plant foods $N_2$, $P_2O_5$ and $K_2O$ in total concentration of about 54.2% and in desired relative proportions by weight of about 3.9 of $N_2$:9.4 of $P_2O_5$:8.0 of $K_2$, which comprises forming an aqueous body containing a solution of $KNO_3$ which is substantially free of $NaNO_3$, said $KNO_3$ being present in an amount sufficient to supply all of said $N_2$, adding to the aqueous body a plant food nitrogen solution in a quantity which adjusts the content of $N_2$ to the stated desired relative proportion thereof, mixing this adjusted aqueous body with a quantity of concentrated superphosphate supplying all of the stated desired proportions of $P_2O_5$, thereby forming a fluid aqueous mixture, and drying the fluid mixture to produce a granular fertilizer mix, said mix having at least 90% of its content by weight in the form of said $KNO_3$ and said superphosphate and having a total plant food nutrient content of about 54.2% and the plant foods $N_2$, $P_2O_5$ and $K_2O$ in respective percentages by weight of about 9.9%, 23.8% and 20.5%.

References Cited in the file of this patent

UNITED STATES PATENTS

| | | |
|---|---|---|
| 1,834,454 | Johnson | Dec. 1, 1931 |
| 1,849,987 | Moore | Mar. 15, 1932 |
| 1,876,501 | Johnson | Sept. 2, 1932 |
| 1,909,829 | Jaenecke | May 16, 1933 |
| 1,916,617 | Jaenecke et al. | July 4, 1933 |
| 1,989,756 | Klugh | Feb. 5, 1935 |
| 2,036,870 | Harvey | Apr. 7, 1936 |
| 2,287,759 | Hardesty et al. | June 23, 1942 |
| 2,703,726 | Hedrick et al. | Mar. 1, 1955 |

UNITED STATES PATENT OFFICE
CERTIFICATE OF CORRECTION

Patent No. 2,804,383 August 27, 1957

Robert D. Pike

It is hereby certified that error appears in the printed specification of the above numbered patent requiring correction and that the said Letters Patent should read as corrected below.

Column 5, line 42, after "basis" and before the comma insert -- is --; column 6, line 64, for "fertiizer" read -- fertilizer --; column 7, line 64, for "absorption to" read -- absorption of --; column 9, line 6, for "$KNO_2$" read -- $KNO_3$ --.

Signed and sealed this 12th day of November 1957.

(SEAL)
Attest:

KARL H. AXLINE

Attesting Officer

ROBERT C. WATSON
Commissioner of Patents